June 26, 1962 D. L. FAVIN 3,041,540

DATA SIGNAL DISTORTION MEASURING CIRCUIT

Filed June 3, 1959 2 Sheets-Sheet 1

INVENTOR
D. L. FAVIN
BY
Charles Scott Phelan
ATTORNEY

June 26, 1962 D. L. FAVIN 3,041,540

DATA SIGNAL DISTORTION MEASURING CIRCUIT

Filed June 3, 1959 2 Sheets-Sheet 2

INVENTOR
D. L. FAVIN
BY
Charles Scott Phelan
ATTORNEY

United States Patent Office 3,041,540

Patented June 26, 1962

3,041,540
DATA SIGNAL DISTORTION MEASURING CIRCUIT

David L. Favin, Whippany, N.J., assignor to Bell Telephone Laboratories, Incorporated, New York, N.Y., a corporation of New York Filed June 3, 1959, Ser. No. 817,783
8 Claims. (Cl. 328—14)

This invention relates to a data pulse wave analyzer. In particular, the invention relates to means including a synchronized pulse generator for quantitatively analyzing certain data wave characteristics.

The copending application Serial No. 817,792, filed June 3, 1959, of R. A. Gilbby, H. Kahl, and J. J. Mahoney, Jr. entitled "Method for Measuring Data Signal Impairment," discloses a method for obtaining a quantitative characterization of a data transmission system. Briefly, that method comprises the steps of transmitting a noncyclic data wave, receiving the data wave, probing each data bit by means of a voltage versus time window, and counting the number of times that data pulses intersect the window. The count provides a single quantitative indication of transmission impairment due to such causes as attenuation, delay, distortion, and noise. A measuring method of the type described is based upon the availability at the measuring location of a cyclic sampling pulse train at the data bit frequency and precisely synchronized with the data wave. The precision of synchronization is important since any frequency discrepancy shifts the sampling time with respect to the data wave and thus shifts the probing window thereby altering the resulting sampling count.

A cyclic sampling pulse train may be transmitted concurrently with the data signal or it may be locally generated at the receiver location. It it is transmitted with the signal, either the cyclic sampling pulses must occupy an additional transmission channel or all measurements must be made on a loop basis so that the transmitter clock signal may be used for sampling the received signal. If the sampling pulse train is generated at the receiving location, there is considerable difficulty in providing such a train at precisely the same frequency, including possible drift of the transmitter clock frequency because, in general, the data signal may not include a frequency component at the particular data bit frequency.

Of course, any data receiver includes means for producing a sampling pulse train at a frequency which is approximately equal to the data bit frequency. However, such means need only assure a sampling operation at some time during each data bit period. A precisely defined sampling time is not required and an accuracy of plus or minus 100 percent of the sampling period is entirely satisfactory for signal detection purposes. For signal impairment measuring purposes, however, such loose timing would not produce results which were sufficiently reliable to provide basis for designing transmission system components.

Accordingly, it is one object of this invention to measure quantitatively the transmission effectiveness of an operating data system by counting data pulses that will probably result in errors under predetermined conditions.

Another object is to generate a train of cyclic pulses of a predetermined frequency in response to a train of noncyclic data pulses which may not include a component at that frequency.

An additional object is to increase the effectiveness of data signal impairment measurements.

Another object of the invention is to generate a train of cyclic sampling pulses in synchronism with the bit rate of a received data pulse wave which may have any one data bit rate within a predetermined range and which does not include a frequency component equal to the one data bit rate.

A further object is to analyze data waves from different data transmission systems with different data bit rates by sampling each data bit of each wave at a controllable time during the bit and with a sampling interval of controllable duration.

These and other objects of the invention are accomplished in an illustrative embodiment thereof in which a noncyclic data pulse wave is employed to drive a clutched, or flywheel, oscillator for generating cyclic oscillations at the data bit frequency. The oscillations are adjusted in time phase with respect to the data wave, and they are shaped to produce pulses at the data bit frequency for actuating a sampling gate to extract a sample of each data bit at a predetermined time during the bit period. A pulse amplitude discriminator is actuated in response to gate output samples of only a certain amplitude range to trigger a counting mechanism. The ratio between the number of samples counted in a given time period and the number of transmitted data bits during the same period is a quantitative indication of data system transmission signal impairment in terms of the signal detection accuracy of a hypothetical receiver having similar sampling time, and sample amplitude detection, ranges. The above-described apparatus is called a bidiameter, i.e. Binary Digital Aperture Meter.

The clutched oscillator is of the type disclosed and claimed in my continuation-in-part application Serial No. 79,775, filed December 30, 1960, and entitled "Method and Apparatus for Synchronizing Oscillators." In the present illustrative embodiment the clutched oscillator is a synchronized phase shift oscillator which is characterized in that once it has been synchronized, it holds the synchronized frequency with substantially no amplitude decrement, and with no further synchronization, for a long time relative to the oscillator period at that frequency. Thus, the clutched oscillator produces one cycle of oscillation for each data bit with a minimum shift in the time phase relationship between the data wave and the oscillation wave in the absence of synchronizing pulses.

A feature of the invention is that the clutched oscillator can be synchronized to different frequencies within a certain range including its natural frequency of oscillation and can therefore be used in bidiameters for evaluating data transmission circuits operating at different data bit rates.

Additional objects and advantages of the invention will be apparent upon a consideration of the following specification, including the drawings, in which.

Figure 1:
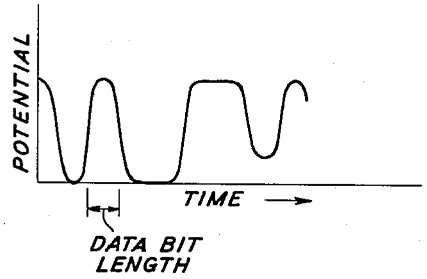
FIG. 1 is a waveform of a typical data wave.
Figure 2:
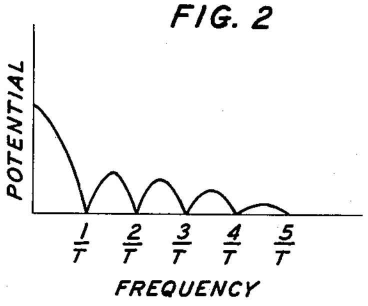
FIG. 2 illustrates the envelope of a frequency spectrum analysis of the data wave of FIG. 1.
Figure 3:
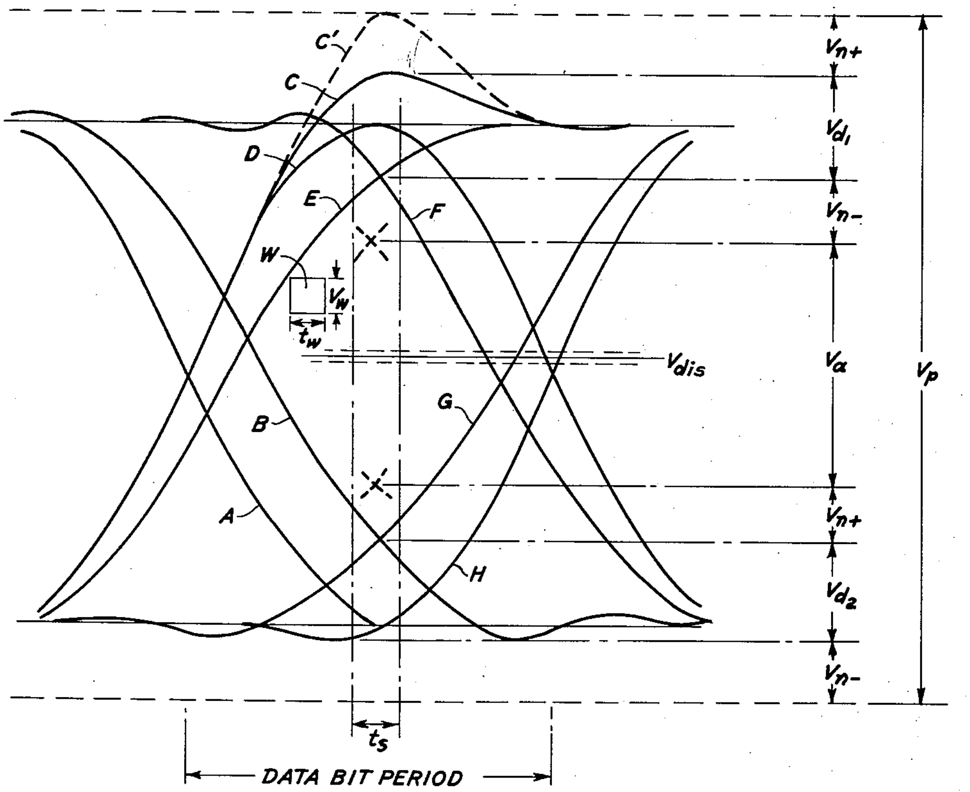
FIG. 3 is a simplified oscilloscope trace of a group of superimposed data bits.

Referring to FIGS. 1 through 3, further details with respect to the problems of obtaining a locally generated sampling pulse train are presented in order to facilitate an understanding of the circuits of the invention. A data signal wave is originally generated under the control of a clock voltage source as a train of noncyclic rectangular pulses. The data wave is a random pulse wave in that one cannot reliably predict whether a particular bit will be a mark or a space. There is no component of the data bit rate present in the data wave because each pulse occupies a time interval equal to the full period of the clock frequency voltage. However, the data wave is synchronous with a fixed periodic time reference, the time reference of the clock voltage, in which each time period has a duration corresponding to the duration of the period of a wave at the clock frequency. Positive-going pulses may be considered to be marks and negative-going pulses may be considered to be spaces. The data wave is passed through a band-pass filter to eliminate all frequencies except the frequencies essential for representing the data. The pass band of the filter is centered on a frequency equal to one half of the bit rate, and the output is still a noncyclic train of pulses, but now each pulse has a generally sinusoidal configuration rather than a rectangular configuration. After the data wave has been passed over a transmission path which may alter the wave by attenuation, envelope delay, noise, or the like, it may have the appearance of the wave illustrated in FIG. 1. The illustrated data wave includes in succession mark, space, mark, space, space, mark, mark potential error, and mark data bits. The potential error is a space bit in which the peak of the bit has been increased positively by noise. The wave is called a "raised cosine" wave since it has a positive average direct current value and it begins at zero time with full mark amplitude. The length of one data bit is indicated on the abscissa of the waveform, and any oscillation at the data bit frequency must complete a full cycle of oscillation in that time.

Referring to the spectrum analysis of FIG. 2, the envelope of the spectrum drops to zero amplitude at the data bit frequency and at harmonics thereof. In other words, the received data wave includes no frequency component at the bit rate thereof. A component at one half of the data bit rate is present in the received signal as hereinbefore mentioned, but the data wave is a random wave in the sense that one cannot predict whether a particular bit period will include a mark or a space. Consequently, at any one particular frequency the wave does not include a useful amount of energy. This can be demonstrated by reference to FIG. 2 which illustrates spectral density. The energy in any particular frequency band $\omega$, which may be defined by the frequencies $f_1$ and $f_2$ is $$\int_{f_1}^{f_2} f(\omega)\, d\omega$$

If the energy is to be found in a band including only one frequency, $f_1$ is equal to $f_2$ and the integral becomes zero. If the band is increased to obtain a useful amount of energy, the additional frequency components in the band cause timing uncertainty, jitter, in the output of any circuit controlled by the energy in the increased band. Accordingly, it is not possible to employ conventional filtering means directly for extracting the data bit frequency, or any other single frequency, from the data wave for use in synchronizing a local pulse generator.

Referring to FIG. 3, the superimposed data bits illustrate some different alterations that may appear in a data wave due to different types of distortion that may be characteristic of a transmission apparatus. Signal alteration due to noise and distortion is illustrated, for example, by the trace C′ of FIG. 3; but similar noise effects may occure at any time and may be either positive-going or negative-going. The traces A and D represent typical undistorted, or reference, space and mark bits, respectively, during the sampling interval $t_s$. Trace A is a mark-space-mark sequence, and trace D is a space-mark-space sequence. Trace B is a mark-space-space sequence of bits which has been so distorted that the first space peak occurs after the sampling interval $t_s$. Trace C is a space-mark-mark sequence of bits which has been distorted by overshoot during the first mark. Trace E is similar to trace C but is characterized by delay which causes the first mark peak to occur after the sampling interval. Trace F is a mark-mark-space sequence distorted so that the peak of the second mark occurs before the sampling interval. Traces G and H are space-space-mark sequences in which distortion has caused the peaks of the second space in each to occur before the sampling interval.

The voltage $V_p$ of FIG. 3 represents the maximum peak-to-peak voltage difference that is likely to be encountered between a mark and a space with maximum amplitude alteration due to both noise and distortion in the sampling interval $t_s$. Voltages $V_{d1}$ and $V_{d2}$ represent the ranges of amplitude alteration of marks and spaces, respectively, due to distortion. Voltages $V_{n+}$ and $V_{n-}$ represent the ranges of positive-going and negative-going amplitude alterations due to noise. Thus, the peaks of traces B and H, and the intersection of traces B and G define the bounds of expected space alteration voltage $V_{d2}$ due to distortion, and the voltage bands $V_{n+}$ and $V_{n-}$ on either side of $V_{d2}$ represent the further space alteration which may occur if noise voltages should occur during the sampling interval. The voltage region dimensioned $V_a$ is the aperture of the data eye and can be expected to be entirely free of traces during the sampling interval, or at least free of traces in excess of the tolerable error rate criterion for the measured system. $V_{dis}$ is the nominal discriminating level of a mark-space discriminator in a data receiver, and the broken lines above and below the $V_{dis}$ level indicate the tolerance range in the operation of such a discriminator.

A rectangle is shown in the eye of the data wave and is hereinafter called a "probing window W." This window has a voltage dimension $V_w$ and a time dimension $t_w$. The dimension $t_w$ is actually the sampling interval for the bidiameter. Both dimensions are variable and the position of window W is variable all as hereinafter described in greater detail in connection with FIG. 4.

The bit period marked in FIG. 3 may in a typical data system be approximately 20 microseconds in duration, and the sampling interval which is indicated as $t_s$ in FIG. 3 may actually be approximately 1 microsecond in duration. It can be readily observed that any shift, or jitter, in the time of occurrence of the sampling interval may cause a substantial number of marks and spaces to fall within the illustrated range of the aperture voltage $V_a$ during the interval $t_s$ thereby effectively reducing the aperture size. Furthermore, jitter in the position of the wave probing window W would similarly throw more bit samples therein and thereby produce a significant inaccuracy in the bidiameter indication.

Figure 4:
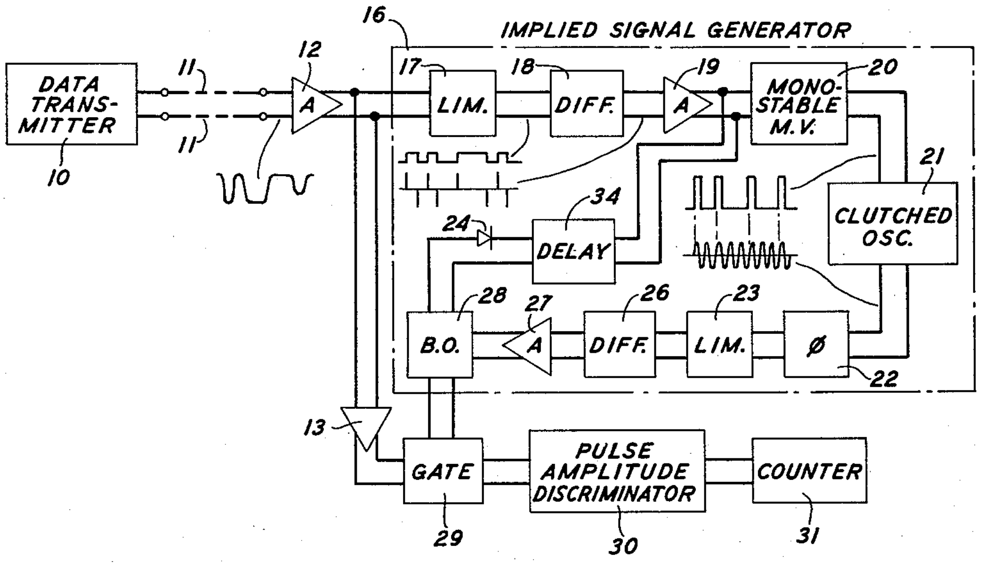
FIG. 4 is a block and line diagram of a data transmission system including a bidiameter in accordance with the invention for evaluating system transmission.

Referring to FIG. 4, the illustrated data transmission system includes a data transmitter 10, a transmission line 11, 11 and an amplifier 12 of a bidiameter connected to the receiving end of the transmission line 11, 11. Normally the data wave at the receiving end of line 11, 11 will also be applied to the input of a data receiver, but these connections are not shown since they do not comprise a part of the invention. The typical data wave illustrated in FIG. 1 is reproduced in FIG. 4 adjacent to transmission line 11, 11. The amplified version of this data wave in the output of amplifier 12 is applied in multiple to the input of a buffer amplifier stage 13 and to the input of a generator 16 which is designated the "implied signal generator." Implied signal generator 16 is so named because it is responsive to the noncyclic data wave for producing a train of cyclic pulses at the data bit frequency, which frequency is only impliedly present in the data wave in that the randomly occurring pulses in the data wave are in synchronism with the fixed periodic time reference frame of the clock frequency voltage.

In generator 16 the data pulses are subjected to both positive and negative limiting by a limiter circuit 17. Ideally limiter 17 should have both excellent low frequency response and good amplitude-to-phase conversion characteristics. The rectangular wave output of limiter 17 is applied to a differentiator 18 for producing positive-going and negative-going impulses in response to the corresponding voltage transitions of the limited data wave. Positive-going differentiator output impulses occur in response to only the first mark pulse in each series of mark pulses. The positive-going differentiator output impulses are applied in enlarged form via an inverting amplifier 19 to the input of a monostable multivibrator 20. Multivibrator 20 produces a positive-going output pulse in response to each of the amplified positive-going differentiator output impulses.

The unstable operating period of multivibrator 20 is established at a duration corresponding to approximately one half of the period of an oscillation at the data bit frequency. Exact correspondence between output pulses from multivibrator 20 and one half of the bit period is not essential, however. Each output pulse from multivibrator 20 is of sufficient amplitude to synchronize clutched oscillator 21 to a frequency such that the leading edge of each output pulse from multivibrator 20 will tend to occur at the same time point in the synchronized oscillatory cycle of oscillator 21. The exact size and duration of such pulses is of course a function of the translating devices employed in multivibrator 20 and in oscillator 21, and a function of the circuit constants employed therewith. One operative example thereof will be hereinafter described in connection with FIG. 5. Briefly, however, the clutched oscillator 21 is a phase shift oscillator, and it is characterized in that it is synchronizable at any one of a number of frequencies within a predetermined frequency range. Oscillator 21 is further characterized in that it exhibits a tendency to continue oscillating at the synchronized frequency with no substantial decrement, and in the absence of synchronizing pulses, for a period of time which is relatively long when compared with the period of oscillation. The illustrated oscillator 21 is designed to produce oscillations at the bit rate of the received data wave.

The cyclic oscillations in the output of oscillator 21 are shifted in phase by a suitable phase shifting circuit 22 in order that the output pulses of generator 16 may occur at a predetermined time during each data bit. The phase shifted oscillations are converted into a train of cyclic positive-going impulses at the same frequency via a limiter 23, a differentiator 26, and an amplifier 27 in a well known manner. Each impulse triggers a single-swing blocking oscillator 28 thereby producing in the output thereof a pulse of a predetermined duration (about one microsecond in one embodiment) and at a predetermined time during each of the successive data bit periods.

Data wave pulses from buffer amplifier 13 are applied to one input of a gate 29. The output pulses from blocking oscillator 28 are applied to the other input of gate 29 to open the gate for the duration of each such pulse and thereby permit a sample of each data pulse to be transmitted therethrough. Data samples in the output of gate 29 are applied to the input of a pulse amplitude discriminator 30 which selects only the sample pulses having peak amplitudes which fall within the voltage dimension $V_w$ of the probing window W in FIG. 3. Pulses in the output of discriminator 30 are totaled by a suitable counter 31.

Although the ability of generator 21 to hold a certain synchronized frequency in the absence of synchronizing pulses is satisfactory for precise measurements as described to this point, it may be improved substantially with a modification of the circuit of FIG. 4. In accordance with the modification, the cyclic oscillations of oscillator 21 are at some convenient point in the circuit coupled back to the input of multivibrator 20 to form a bootstrap type of circuit by which oscillator 21 can synchronize itself as long as it is first synchronized by an incomnig data wave. The illustrated bootstrap circuit couples the cyclic pulses in the output of blocking oscillator 28 to multivibrator 20 and includes a series-connected diode 24 which blocks pulses amplified in amplifier 19 from the output of oscillator 28. An adjustable delay network 34 may also be included to offset the effect of phase shifting circuit 22 so that the leading edges of pulses from oscillator 28 will coincide with any differentiated pulses that may occur in amplifier 19. Thus, a differentiated pulse from amplifier 19 blocks a coincident pulse from oscillator 28 and triggers multivibator 20; but in the absence of a differentiated pulse from amplifier 19, the pulses from oscillator 28 trigger multivibrator 20 once for each bit period.

The system of FIG. 4 is operated for some predetermined length of time which may vary from a number of seconds to a number of days. During that time the number of data bits transmitted is readily calculable and can be compared with the total number of pulse samples counted during the same period to obtain a quantitative indication of the transmission quality of the system with respect to a particular probing window size and location. By varying the window location, data can be obtained to plot contours of equal pulse sample count in the aperture; and if each counted sample represents a possible error due to transmission impairment, the plotted contours will indicate system operating accuracy margins. By varying the window voltage and time dimensions, $V_w$ and $t_w$, the detection accuracy of any particular mark-space discriminator can be determined.

Summarizing with respect to FIG. 4, the random data pulse train of predetermined time phase and which includes no frequency component at the data bit rate is employed to synchronize a clutched oscillator 21 having a flywheel characteristic for generating uniform cyclic oscillations at the data bit rate. The latter oscillations are shaped into cyclic pulses for actuating a gate 29 at a certain time during each successive data bit. The discriminator 30 selects data samples in the output of gate 29 which have maximum amplitudes lying within the voltage dimension of the probing window. The selected samples are counted by the counter 31.

Figure 5:
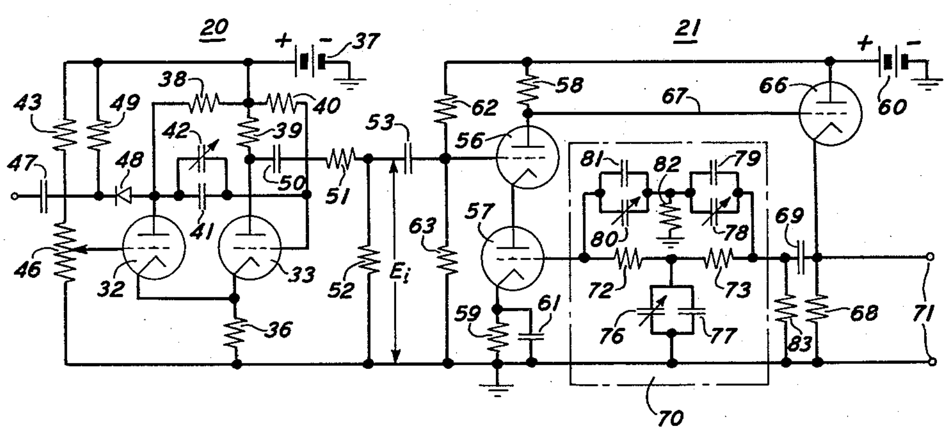
FIG. 5 is a schematic diagram of a portion of the circuit of FIG. 4 which includes a clutched oscillator in accordance with the invention for generating synchronized cyclic oscillations.

Referring to FIG. 5, there is shown a schematic diagram of multivibrator 20 and the clutched oscillator 21. The multivibrator 20 is a cathode-coupled monostable circuit in which a tube 32 is normally nonconducting in the absence of an input pulse, and a tube 33 is normally conducting. The cathodes of tubes 32 and 33 are connected to ground via a common cathode resistor 36. The anodes of tubes 32 and 33 are connected to a source 37 of operating potential via load resistors 38 and 39, respectively. The control grid of tube 33 is connected to source 37 via a resistor 40, and it is also connected to the anode of tube 32 via the parallel connected capacitors 41 and 42. The bias level for the control grid of tube 32 is fixed by a potential divider which comprises a resistor 43 connected in series with a potentiometer 46 between the terminals of source 37. An adjustable tap on potentiometer 46 is connected to the control grid of tube 32. Negative-going input pulses from amplifier 19 in FIG. 4 are applied to multivibrator 20 via a series circuit which includes a coupling capacitor 47 and a diode 48. The last-mentioned series circuit is connected between amplifier 19 and the anode of tube 32 with diode 48 being poled for forward conduction of current away from tube 32. A resistor 49 is connected between the positive terminal of source 37 and the cathode of diode 48 for establishing the conducting point of the diode.

Each negative-going input pulse to multivibrator 20 is coupled to the control grid of tube 33 via capacitors 41 and 42 and initiates the transfer of conduction from tube 33 to tube 32 in a well known manner. After a predetermined time, which is a function primarily of the capacitances of capacitors 41 and 42 and the resistances of resistors 38 and 40, conduction is automatically restored to tube 33 thereby completing the generation of a positive voltage pulse at the anode of tube 33. This positive pulse is coupled via a capacitor 50, a potential divider which includes a series resistor 51 and a shunt resistor 52, and a coupling capacitor 53 to the input of the clutched oscillator 21. Multivibrator 20 supplies pulses of controllable duration in response to triggering impulses; resistors 51 and 52 reduce the pulse amplitude to the desired level; and coupling capacitors 50 and 53 prevent interaction between the steady state potentials in multivibrator 20, oscillator 21, and the resistors 51 and 52.

Oscillator 21 includes a cascode amplifier stage and a cathode follower stage connected in tandem. The cascode stage includes tubes 56 and 57 which have the space current paths thereof connected in series with an anode load resistor 58 and a cathode self bias resistor 59 between ground and the positive terminal of a source 60 of operating potential. A by-pass capacitor 61 shunts resistor 59. The normal bias level for the control grid of tube 56 is established by means of a potential divider including the series connected resistors 62 and 63 which are connected between the terminals of source 60 and which have the common terminal thereof connected to the control grid of tube 56. The output of the cascode stage is directly coupled from the anode of tube 56 to the control grid of a cathode follower tube 66 via a lead 67. Tube 66 is connected in series with its cathode load resistor 68 between the terminals of source 60. The output of tube 66 is coupled from the cathode thereof to the control grid of tube 57 via a regenerative feedback path which includes a coupling capacitor 69 and a frequency-sensitive impedance network 70. The output voltage of clutched oscillator 21 appears across resistor 68 at the output terminals 71, 71 for application to the phase shifting circuit 22 in FIG. 4.

The network 70 is a twin-T network which provides in the pass band thereof the necessary phase shift for regenerative feedback from the cathode follower stage to the cascode stage. Network 70 includes a high-pass filter section and a low-pass filter section connected in parallel and sharply tuned for minimum attenuation in a narrow band of frequencies which includes the desired output frequency of the clutched oscillator. The low-pass filter section includes in the series path resistors 72 and 73 and in the shunt path the parallel-connected variable capacitor 76 and fixed capacitor 77. The high-pass filter section of the twin-T network 70 includes in the series path thereof the shunt connected variable capacitor 78 and fixed capacitor 79 and the shunt-connected variable capacitor 80 and the fixed capacitor 81. The high-pass section includes in the shunt path thereof a resistor 82. A resistor 83 is connected between ground and the common terminal of coupling capacitor 69 and network 70 for completing the direct current bias circuit from ground to the control grid of tube 57 via resistors 72 and 73.

Variable capacitors are provided in the twin-T network 70 and in the cross coupling network of multivibrator 20 in order that the clutched oscillator frequency and phase shift and the multivibrator output pulse duration may be varied through small ranges in order to adjust these circuits as necessary for optimum performance.

Considering the operation of the circuits of FIG. 5 the negative-going impulses in the output of amplifier 19 trigger multivibrator 20 at a time which coincides with the leading, or positive-going, edge of a mark pulse. The multivibrator output pulse is coupled to the input of the cascode stage of oscillator 21 with sufficient amplitude to accomplish synchronization, i.e. if pulses were received from multivibrator 20 in a cyclic manner, oscillator 21 would oscillate at the frequency of such pulses even though its natural oscillatory frequency may not be the same as the frequency of the cyclic pulses. The technique of synchronizing resonant oscillators and astable multivibrators by means of a cyclic input wave is of course well known in the prior art. However, noncyclic input waves are not generally employed in the prior art because the oscillator output frequency shifts back to its natural frequency almost immediately upon the loss of a synchronizing pulse.

It is known that the oscillator circuit 21 will oscillate at some natural frequency in the pass band of network 70 if no synchronizing pulses are applied thereto. However, it has been found that once oscillator 21 has been synchronized at any of the frequencies in the above-mentioned passband, it continues to operate at the synchronized frequency in the absence of further synchronizing pulses, and without substantial decrement, for a period of time which is relatively long when compared to the period of its output oscillations, i.e. the original bit rate.

Without limiting the invention to a particular mode of operation, it is thought that the clutching tendency of oscillator 21 may be due at least in part to the relation between the amplitude of the output pulse of multivibrator 20 and the operating point of the cascode stage tubes in oscillator 21. It has been observed that the output voltage versus frequency response of oscillator 21 exhibits a flat, or plateau, region which coincides with the clutch range and the region of maximum output voltage amplitude. This is in contrast to the usual rounded peak exhibited in circuits employing twin-T filter networks. It is thought that the plateau effect and the clutching tendency are related and that the plateau effect in the oscillator response characteristic may result from driving at least one tube of the cascode stage into a nonlinear portion of its characteristic. Reduction of input pulse amplitude to oscillator 21 reduces the plateau width and increases the resulting jitter observed in the position of output pulses from blocking oscillator 28 for synchronized frequencies which are widely separated from the natural oscillating frequency of the circuit.

In one practical embodiment of the circuit of FIG. 5 which had a natural frequency of oscillation at 50 kilocycles per second and which had a clutch range between 48 and 51 kilocycles per second, the output from multivibrator 20 was a pulse of approximately 50 volts amplitude and 10 microseconds duration. The following circuit elements were employed in the last-mentioned embodiment:

| | |
|---|---|
| Tubes **32**, **33**, **56**, **57**, and **66** | Western Electric 396A. |
| Sources **37** and **60** | 300 volts. |
| Diode **48** | Western Electric 400A. |

| Resistors: | Ohms |
|---|---|
| R36 | 4,700 |
| R38 | 18,000 |
| R39 | 18,000 |
| R40 | 470,000 |
| R43 | 150,000 |
| R46 | 100,000 |
| R49 | 33,000 |
| R51 | 330,000 |
| R52 | 100,000 |
| R58 | 24,000 |
| R59 | 300 |
| R62 | 220,000 |
| R63 | 110,000 |
| R68 | 47,000 |
| R72 | 14,700 |
| R73 | 14,700 |
| R82 | 14,700 |
| R83 | 1 |

Capacitors:

| | | |
|---|---|---|
| C41 | micromicrofarads | 50 |
| C42 | do | 7 to 45 |
| C47 | microfarads | 10 |
| C50 | do | 10 |
| C53 | do | 10 |
| C61 | do | 50 |
| C69 | micromicrofarads | 0.1 |
| C76 | do | 600 |
| C77 | do | 7 to 45 |
| C78 | do | 7 to 45 |
| C79 | do | 130 |
| C80 | do | 7 to 45 |
| C81 | do | 130 |

It has been found that the application of a random data wave with as many as 10 successive bit periods having no space-to-mark transitions therein to the generator 16 which included the circuits of FIG. 5 with the above recited circuit constants produced a train of 50 kilocycles per second oscillations at terminals 71, 71 with less than one electrical degree of jitter. In other words, synchronizing input pulses could be removed entirely from the input of clutched oscillator 21 for a time equivalent to 10 cycles of oscillation without producing as much as one electrical degree, or 55 millimicroseconds, of shift in the time of occurrence of the resulting sampling pulse from blocking oscillator 28.

In summary, a noncyclic pulse train from multivibrator 20 is employed to synchronize a nonresonant phase shift oscillator, clutched oscillator 21. The oscillator 21 exhibits a clutching range in which it will synchronize to any frequency within the range, and it further exhibits a distinct tendency to hold the synchronized frequency for a relatively long time. A bootstrap feedback arrangement can also be provided for substantially increasing the ability of oscillator 21 to hold the synchronized frequency in the absence of synchronizing pulses.

Although this invention has been described in connection with particular applications and embodiments thereof it is to be understood that additional applications and modifications will be obvious to those skilled in the art without departing from the spirit and scope of the invention.

What is claimed is:

1. A circuit for analyzing the effects of noise and transmission distortion on a noncyclic data pulse wave comprising positive-going and negative-going voltage pulses with voltage transitions therebetween, said circuit comprising a gate circuit having one input thereof connected to receive said data pulse wave, a counter, a pulse amplitude discriminator connected between said counter and the output of said gate for actuating said counter in response to only those gate output pulses which exceed a first predetermined amplitude but do not exceed a second predetermined amplitude, an oscillation generator for producing cyclic pulses of a predetermined duration at the bit rate of said data wave, said generator comprising a pulse generator also receiving said data pulse wave and producing a pulse of predetermined duration and amplitude in response to each data voltage transition at said noncyclic data pulse wave in a certain direction, a nonresonant oscillator tuned for maximum gain in a frequency range which includes said bit rate, means for applying the last-mentioned pulses to the input of said oscillator for synchronizing the oscillations therein, phase control means connected to the output of said oscillator for adjusting the time phase relationship of said oscillations with respect to the time of occurrence of individual data pulses in said noncyclic data pulse wave, and wave shaping means responsive to said phase shifted oscillations for producing said cyclic pulses, and means for applying said cyclic pulses to another input of said gate for conditioning said gate for the transmission to said discriminator of a sample of said data pulse wave in response to each cyclic pulse.

2. In a data wave analyzer which includes means for receiving a noncyclic data wave having positive-going and negative-going voltage pulses representing data bits, a gate circuit having one input thereof connected to said receiving means, a counter, and a pulse amplitude discriminator connected between said counter and the output of said gate for actuating said counter only in response to those gate output pulses which exceed a first predetermined amplitude but do not exceed a second predetermined amplitude, the improvement in said wave analyzer which comprises an oscillation generator responsive to said data wave for producing said cyclic sampling pulses at the bit rate of said data wave, said generator comprising means for generating an impulse of predetermined duration and amplitude in response to each voltage transition in a certain direction between said voltage pulses, means connecting the input of said generator to said receiving means, a non-resonant oscillator tuned for maximum gain in a frequency range which includes said bit rate, means for applying said impulses to the input of said oscillator for synchronizing the oscillations therein, wave shaping means responsive to said oscillations for producing said cyclic pulses, and means for applying said cyclic pulses to another input of said gate for conditioning said gate for the transmission of a sample of each data bit in response to each cyclic pulse.

3. In a data wave analyzer which includes means for receiving a noncyclic data wave having positive-going and negative-going voltage pulses representing data bits, a gate circuit having one input thereof connected to said receiving means, a counter, and a pulse amplitude discriminator connected between said counter and the output of said gate for actuating said counter only in response to those gate output pulses which exceed a first predetermined amplitude but do not exceed a second predetermined amplitude, the improvement in said wave analyzer which comprises an oscillation generator responsive to said data wave for producing said cyclic sampling pulses at the bit rate of said data wave, said generator comprising means for generating an impulse of predetermined duration and amplitude in response to each voltage transition in a certain direction between said voltage pulses, means connecting the input of said generator to said receiving means, a nonresonant oscillator tuned for maximum gain in a frequency range which includes said bit rate, means for applying said impulses to the input of said oscillator for synchronizing the oscillations therein, wave shaping means responsive to said oscillations for producing said cyclic pulses, a bootstrap circuit connected between said wave shaping means and said input of said generator for synchronizing said oscillator with its own output in the absence of said voltage transitions, and means for applying said cyclic pulses to another input of said gate for conditioning said gate for the transmission of a sample of each data bit in response to each cyclic pulse.

4. The data wave analyzer in accordance with claim 3 in which said bootstrap circuit comprises a unidirectional conducting device connected in series therein and normally biased nonconducting in the presence of said voltage transitions, said cyclic pulses biasing said device into conduction in the absence of said transitions.

5. A circuit for analyzing the effects of noise and distortion on a noncyclic data pulse wave comprising positive-going and negative-going voltage pulses with voltage transitions therebetween, said circuit comprising means for receiving said data pulse wave, a gate circuit having one input thereof connected to the output of said receiving means, a counter, a pulse amplitude discriminator connected between said counter and the output of said gate for actuating said counter in response to only those gate output pulses which exceed a first predetermined amplitude but do not exceed a second predetermined amplitude, an oscillation generator for producing cyclic pulses of a predetermined duration at the bit rate of said data wave, said generator comprising first and second electron tubes having an anode, a cathode, and a control grid, means for connecting the space current paths of said first and second tubes in series between the terminals of a source of operating potential, means coupling the output of said receiving means between the cathode of said first tube and the grid of said second tube, a cathode follower circuit, means connecting the anode of said second tube to the input of said cathode follower circuit, a parallel-T network connecting the output of said cathode follower circuit to the control grid of said first tube for supplying feedback thereto, said network including a low-pass filter section and a high-pass filter section connected in parallel, and means further connecting the output of said cathode follower circuit to a second input of said gate.

6. In a data wave analyzer which includes means for receiving a noncyclic data wave having positive-going and negative-going voltage pulses representing data bits, a gate circuit having one input thereof connected to said receiving means, a counter, and a pulse amplitude discriminator connected between said counter and the output of said gate for actuating said counter only in response to those gate output pulses which exceed a first predetermined amplitude but do not exceed a second predetermined amplitude, the improvement in said wave analyzer which comprises an oscillation generator responsive to said data wave for producing cyclic sampling pulses at the bit rate of said data wave, said generator comprising first, second, and third electron tubes each having an anode, a cathode and a control grid, means connecting the space current paths of said first and second tubes in series, means applying operating potential to all of said tubes, a connection between the anode of said second tube and the control grid of said third tube, a parallel-T network connected for regeneratively coupling the cathode of said third tube to the control grid of said first tube for the production of cyclic oscillation pulses, said network providing substantially lower attenuation at a frequency in a range of frequencies including said predetermined frequency than at frequencies outside of said range, means connecting the output of said receiving means between the cathode of said first tube and the control grid of said second tube for synchronizing said oscillator circuit, and means applying said cyclic pulses in the cathode circuit of said third tube to a second input of said gate.

7. In a data wave analyzer which includes means for receiving a noncyclic data wave having positive-going and negative-going voltage pulses representing data bits, and sampling means connected to said receiving means for cyclically sampling said wave to produce an output which is a function of the number of samples with peak amplitudes in a predetermined range, the improvement in said wave analyzer which comprises an oscillation generator that is naturally oscillatory at a first frequency and responsive to said data wave for producing cyclic sampling pulses at a second frequency that is equal to the bit rate of said data wave, said generator comprising a cascode-type of amplifier stage having two input connections and one output connection, means coupling the output of said receiving means to one of said cascode stage input connections for synchronizing said oscillator, said data pulses being synchronous with a fixed periodic time reference at said second frequency and each data pulse duration being equal to the period of said reference, each of said pulses also being of sufficient amplitude as coupled to drive said amplifier stage into a nonlinear portion of its operating characteristic, a bandpass filter regeneratively coupling said output connection to a second one of said input connections for generating cyclic oscillations at said cascode stage output connection, said filter having minimum attenuation at said natural oscillatory frequency, and means applying said oscillations to control said sampling means.

8. A data wave analyzer comprising means for receiving a noncyclic data wave having positive-going and negatove-going voltage pulses representing data bits, the duration of a single bit being equal to the period of a cyclic oscillation at the bit frequency, a voltage component at said frequency being absent from said wave, a gate circuit having two input connections and one output connection, first and second signal paths coupling the output of said receiving means to said gate input circuits, respectively, said first path including means for transmitting said data wave to said gate circuit, said second path including frequency synthesizing means responsive to predetermined voltage transitions in said wave for synthesizing a cyclic voltage wave at said bit frequency and applying such synthesized wave to control said gate for sampling said data wave, an amplitude discriminator, means applying data wave samples in the output of said gate to the input of said discriminator, means biasing said discriminator to transmit only those samples having peak amplitudes lying between two predetermined amplitude levels, and means connected to the output of said discriminator for totaling the samples gated therethrough.

References Cited in the file of this patent

UNITED STATES PATENTS

| | | |
|---|---|---|
| 2,568,868 | Pratt | Sept. 25, 1951 |
| 2,678,425 | Hoeppner | May 11, 1954 |
| 2,761,966 | Dickensen et al. | Sept. 4, 1956 |
| 2,902,656 | Soffel | Sept. 1, 1959 |
| 2,912,585 | Sullivan et al. | Nov. 10, 1959 |
| 2,915,630 | Bigelow | Dec. 1, 1959 |